United States Patent [19]

Carrigan

[11] 4,093,324
[45] June 6, 1978

[54] SEAL FOR SELF-ALIGNING BEARING

[75] Inventor: Erwin R. Carrigan, Manchester, Ohio

[73] Assignee: Emerson Electric Co., St. Louis, Mo.

[21] Appl. No.: 797,278

[22] Filed: May 16, 1977

[51] Int. Cl.² ............................................. F16C 33/80
[52] U.S. Cl. .................................. 308/187.1; 277/30; 277/57
[58] Field of Search ................. 308/29, 36.1, 72, 194, 308/187, 187.1, 187.2; 277/30, 55, 56, 57

[56] References Cited

U.S. PATENT DOCUMENTS 2,734,758   2/1956   Schanke ........................... 308/187.1

*Primary Examiner*—Trygve M. Blix
*Assistant Examiner*—Charles E. Frankfort
*Attorney, Agent, or Firm*—Charles E. Markham

[57] ABSTRACT

Sealing apparatus for a self-aligning bearing having a one-piece housing comprising three annular members on each side of the bearing, two of which members are axially assembled and fixed in the housing, the third annular member of each trio being axially assembled on the inner bearing race for rotation therewith and extending axially and radially between the other two, the three annular members each having axially and radially extending walls spaced from and coextending with axially and radially extending walls of the other two to form a tortuous path.

8 Claims, 10 Drawing Figures

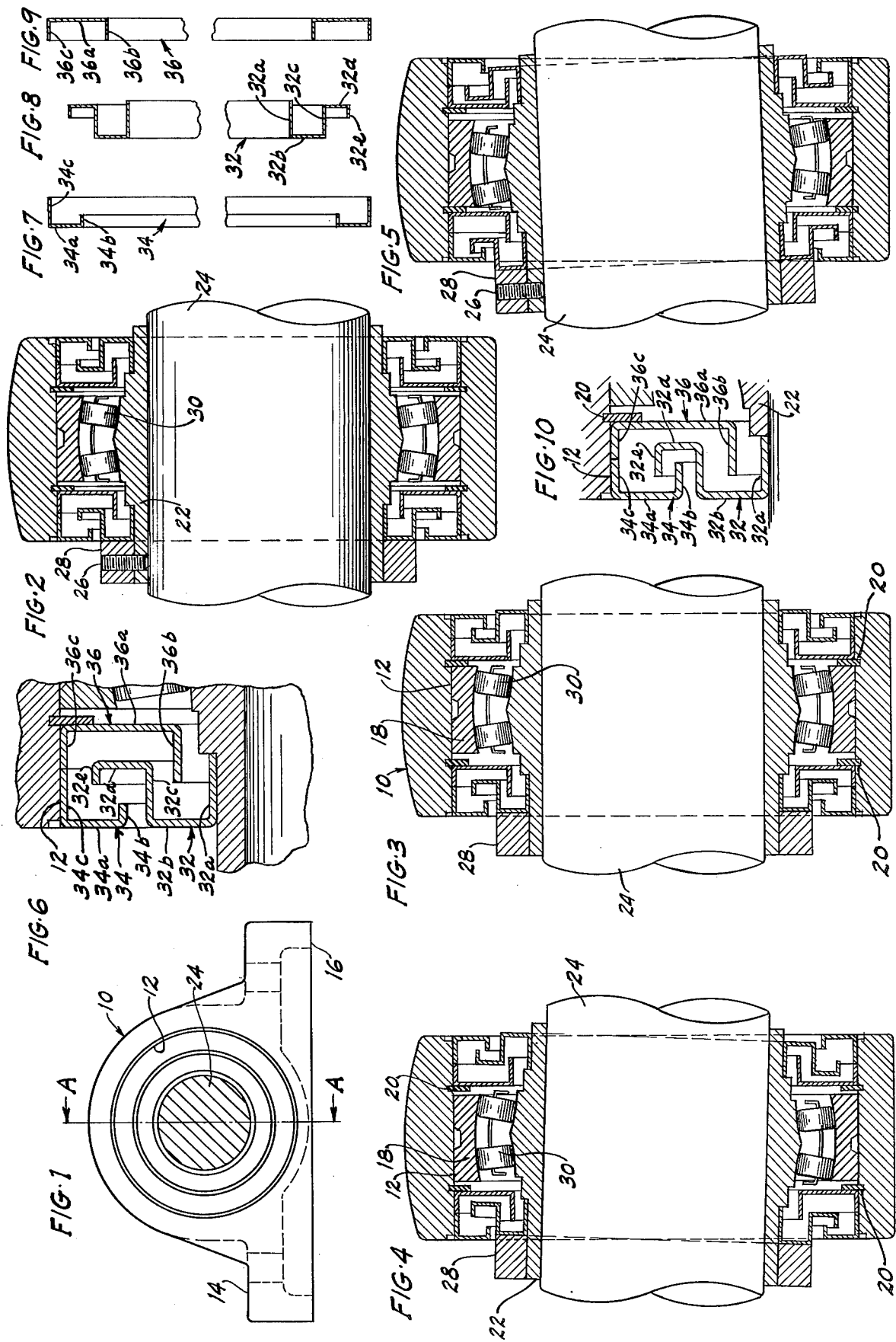

SEAL FOR SELF-ALIGNING BEARING

This invention relates to free-running sealing means for self-aligning bearings and particularly to a simple and economical construction which permits substantial linear shaft expansion and shaft misalignment without contact of moving and static surfaces and without loss of its sealing effectiveness.

Labyrinth seals for self-aligning bearings having sufficient wall spacing to permit some shaft expansion or misalignment without contact of relatively moving surfaces have been employed. Usually these seals have comprised an annular rotating member attached to the shaft or inner bearing race and an annular stationary member attached to the bearing housing, with each member having axially and radially extending portions spaced from and coextending with axially and radially extending portions of the other. Coextension of radially extending portions in these seals must, of course, be limited to permit axial assembly of the annular members into their intended juxtaposed relationship in a one-piece bearing housing.

I have found by including a third annular sealing member extended radially and axially between radially and axially extending portions of the other two members that coextension of radial portions of the members may be increased and overlapped while permitting axial assembly of the sealing members. In this arrangement, the third annular member is mounted so that there is relative rotational movement between it and the other two members when a journalled shaft is rotating. Increased extension and overlapping of radially extending portions, together with coextension of axially extending portions, provides a more effective sealing labyrinth by increasing the number of sharp directional changes required to negotiate the tortuous path. Hand in hand, therefore, a more effective sealing labyrinth permits greater spacing of the labyrinth walls to accommodate greater expansion or misalignment of a journalled shaft without interference of the rotating and stationary annular sealing members and without loss of sealing effectiveness.

Accordingly, it is an object of this invention to provide a generally new and improved sealing means for self-aligning bearings which is of simple, economical construction, provides an effective seal while accommodating substantial misalignment of a journalled shaft, and may be conveniently assembled in a one-piece bearing housing;

A further object is to provide a sealing means as in the preceding paragraph which provides an effective labyrinth seal while accommodating both substantial misalignment and substantial contraction and/or expansion of a journalled shaft;

A further object is to provide a labyrinth seal comprising three annular members, one of which extends axially and radially between axially and radially extending walls of the other two and in which there is relative rotational movement between the one and other two annular members.

Further objects and advantages will appear from the following complete description when read in connection with the accompanying drawing.

In the drawing:

FIG. 1 is a face side elevational view of a self-aligning bearing having a one-piece housing and a sealing means constructed in accordance with the present invention;

FIG. 2 is a cross-sectional view taken along line A—A of FIG. 1; in this view the journalled shaft is horizontal and the bearing is in a mid-position between two snap rings;

FIG. 3 is a cross-sectional view taken along line A—A of FIG. 1; in this view the journalled shaft is horizontal and the bearing is shifted axially to the right against the righthand snap ring;

FIG. 4 is a cross-sectional view taken along line A—A of FIG. 1; in this view the bearing is in a mid-position between the snap rings and the journalled shaft is misaligned in a direction to rotate the inner bearing race clockwise with respect to the outer race;

FIG. 5 is a cross-sectional view taken along line A—A of FIG. 1; in this view the bearing is shifted axially to the left against the left-hand snap ring and the journalled shaft is misaligned in a direction to rotate the inner race counterclockwise with respect to the outer race;

FIG. 6 is an enlarged fragmentary sectional view showing in detail a predetermined spacing and coextension of radial and axial portions of the sealing members when the journalled shaft is horizontal and the bearing in mid-position axially;

FIGS. 7, 8, and 9 are cross-sectional views, respectively, of the outer stationary annular member, the central rotating annular member, and the inner stationary annular member; and FIG. 10 is an enlarged, detailed, cross-sectional view showing another predetermined coextension and spacing of radially and axially extending portions of the sealing members.

Referring now to the drawing in more detail, a one-piece bearing housing is generally indicated at 10 having a bore 12 therethrough and a base portion 14 having a lower surface 16 which is perpendicular to a vertical center line through the center of bore 12 in both axial and transverse planes. Snugly fitted in bore 12 is an outer bearing race 18 which is slidable axially a short distance between axially spaced snap rings 20 when an axial force is applied. Snap rings 20 are entered into annular grooves in the bore 12. An inner bearing race 22 slidably receives a shaft 24, which shaft is fixed therein by one or more set screws 26 passing through a locking collar 28 and an axial extension of the inner bearing race 22. A double row of roller bearings 30, including conventional cage retaining means, roll freely between an arcuate surface of the outer race 18 and opposed arcuate surfaces of the inner race 22 as the shaft 24 and inner race 22 rotate. The arrangement permits limited misalignment of shaft 24 as well as axial shifting of the entire bearing.

Positioned between the inner race 22 and the wall of the bore 12 on both faces of the bearing housing is a seal comprising three rings or annular members 32, 34, and 36. The members 34 and 36 are generally channel form in cross section with radially extending web portions 34a and 36a and inner and outer axially extending flange portions 34b and 34c and 36b and 36c, respectively. Members 36 are press fitted into bore 12 with the backs of their web portions 36a against the snap rings 20 and their flange portions 36b and 36c extending axially outward. Members 34 are press fitted into bore 12 with the backs of their web portions 34a facing outward and their flange portions 34b and 34c extending axially inward. The length of the radial web portions 36a of members 36 is less than the distance between the wall of bore 12 and the inner bearing race 22 so that their flanges 36b are spaced from the inner race 22. Also, the length of the radial web portions 34a of members 34 is shorter than the web portions 36a of members 36 and their flanges 34c and 36c are in axial alignment, so that the configuration of a cross section through the members 34 and 36, when assembled, will be generally that of a block letter "G."

Annular members 32 have the general form of a block letter "S" in cross section, with outer axial portions 32a press fitted on cylindrical extensions of the inner bearing race 22, outward facing radial portions 32b, intermediate axial portions 32c extending axially inward, inward facing radial portions 32d and outward extending outer axial portions 32e. Referring to FIG. 6, the outer and intermediate axial portions 32a and 32c are spaced radially on opposite sides of flange 36b of member 36 and coextend therewith. The outer axial portions 32e of members 32 lie between the flanged portions 34b and 34c of member 34 and coextend with flange portions 36c and 34c under some conditions and coextend with flanges 34c and 34b under other conditions. The radially extending portions 32b of members 32 coextend with radial web portions 36a of members 36, and radially extending portions 32d lie between and coextend with web portions 34a and 36a of members 34 and 36.

Briefly, the cross-sectional configuration of members 32, 34, and 36 in assembled condition in bore 12 may be defined as a block letter "G" and a reversed block letter "S" entwined therein. This arrangement which comprises two annular static members and one annular rotating member may be conveniently assembled in a one piece housing and provides a more effective labyrinth seal than a two member seal arranged for axial assembly in a one-piece housing. The arrangement could obviously be reversed from that illustrated; that is, the members 34 and 36 could be press fitted on a cylindrical extension of member 22 for rotation with a journalled shaft and the member 32 press fitted into bore 12 of the bearing housing. The exclusive use of this alternate arrangement is contemplated.

Referring to FIG. 2, a predetermined spacing of the coextending portions of sealing members 32, 34, and 36 is indicated when the journalled shaft 24 is concentric with the bore 12 in housing 10 and when the bearing is positioned axially midway between the snap rings 20.

In FIG. 3 the journalled shaft 24 is also concentric with the bore 12, but the bearing is shifted to the right with the outer bearing race 18 against the right-hand snap ring 20 as would occur as the result of substantial expansion or contraction of a length of shaft 24 between two bearings. Under these conditions, the predetermined spacing of the axial sealing members is altered.

Specifically, on the left-hand face, the space between radially coextending portions 34a and 32d is increased and coextension of axial portions 34b and 32c is decreased, but the space between radial coextending portions 32d and 36a is decreased and coextension of axial portions 32a and 36b is increased. The decrease in spacing of radial portions 32d and 36a and the increased coextension of axial portion 36b with axial portions 32a and 32c more than compensate for the increase in spacing of coextending radial portions 32d and 34a and the decrease in coextension of axial portions 32c and 34b and, therefore, increase rather than decrease the effectiveness of the seal. This is so because the length of coextension of the radial portions 32d and 36a is substantially twice that of the coextension of the radial portions 34a and 32d, and the coextension of axial portion 36b with both axial portions 32a and 32c is equal to substantially twice that of the coextension of axial portion 32c with 34b.

On the right-hand face in FIG. 3, the spacing of coextending radial portions 32d and 36a is increased and coextension of axially coextending portions 36b with axial portions 32a and 32c is decreased, but the spacing between coextending radial portions 34a and 32d is decreased and axial portions 32e and 34b approach overlapping or coextending positions. The decrease in spacing of radial portions 32d and 34a and particularly the approach to overlapping or coextension of axial portions 32e and 34b, which increases the directional changes in the tortuous path by two, more than compensates for the increase in spacing between coextending radial portions 32d and 36a and decrease in coextension of axial portion 36b with 32a and 32c.

Referring to FIG. 4, the bearing is positioned midway between the limiting snap rings 20, but the journalled shaft 24 is misaligned; that is, it is rotated clockwise with reference to FIG. 4. Under these conditions, it will be seen that at some circumferentail point the spacing of radial coextending portions 32d and 34a begins increasing and the spacing between radial coextending portions 32d and 36a and between axial portions 32c and 34b begins decreasing.

Also, at a diametrically opposed, circumferential point, the space between coextending radial portions 36a and 32d, and between axial portions 32e and 34c, and between 32c and 34b begins increasing, and coextension of axial portions 36b with 32a and 32c begins decreasing at the same time the space between radial portions 32d and 34a, between axial portions 32e and 34b, and between 36b and 32c begins decreasing. More important, however, is the fact that coextension or overlapping of axial portions 34b with portions 32c and 32e is approached at this time, causing an additional complete reversal of direction in the labyrinth. For the reasons set forth in connection with FIG. 3, the effectiveness of the seal is therefore either maintained or improved as misalignment of the journalled shaft progresses.

In FIG. 5, the bearing is shifted toward the left against the left-hand snap ring 20 and the journalled shaft 24 is misaligned, that is, rotated counterclockwise with respect to FIG. 5. Under these conditions, changes in the coextension of and spacing of coextending portions of the sealing members 32, 34, and 36 from that shown in FIG. 2 follows the same pattern as in FIG. 4, except to a greater degree while maintaining or improving the effectiveness of the seal.

It is to be understood that the spacing of radial and axial coextending portions may be decreased substantially and the axial portions 34b, 32c, and 32e lengthened, as shown in FIG. 10, in order to provide a larger and more tortuous path between the exterior and the bearing under all conditions of shaft alignment or misalignment. Obviously, the spacing of coextending radial and axial portions of the members and the lengths of axial portions 32c, 32e, and 34b will determine the permissible degree of bearing shifting or shaft misalignment while maintaining a free-running seal.

I claim:

1. In a free-running bearing seal axially assembled in an annular space between a journalled shaft and a bearing housing, comprising:

a first annular member of channel form in cross section having a radially extending web portion and an axially extending flange at each end thereof, a second annular member of channel form in cross section having a shorter radially extending web portion and an axially extending flange at each end thereof, said first and second members being arranged with their radial web portions coextending, with their flanges extending toward each other, and with their flanges at one end in axial alignment, whereby said first and second members together have the form in cross section of a block letter "G,"

a third annular member of generally block letter "S" form in cross section has first and second outer oppositely extending axial portions, an intermediate axial portion, a first radially extending portion connecting said intermediate axial portion with said first outer axial portion, and a second radially extending portion connecting said intermediate and second outer axial portions, said third member having its first radial portion positioned between and coextending with said radially extending web portions of said first and second members, with its intermediate axial portion lying between and coextending with said flange portions at the said other ends of said first and second members, with its first outer axial portion lying between the flanges of said second member and extending to a free end toward the web portion of said second member, with its second outer and intermediate axial portions lying on opposite side of and coextending with said flange at the said other end of said first member, and said radially and axially coextending portions of said members being spaced and the free ends of said axially extending portions being spaced from adjacent radially extending portions to permit free relative rotation between said first said second members and said third member.

2. The bearing seal claimed in claim 1 in which said axially aligned flanges at said one end of said first and second annular members are axially assembled and fixed in the bearing housing and said second outer axial portion of said third member is fixed to the journalled shaft.

3. The bearing seal claimed in claim 1 in which said second outer axial portion of said third annular member is axially assembled and fixed in the bearing housing and said axially aligned flanges at said one end of said first and second annular members are fixed to the journalled shaft.

4. The bearing seal claimed in claim 1 in which said axially aligned flanges at said one end of said first and second members are press fitted into a bore in the bearing housing and said second outer axial portion of said third member is press fitted on a cylindrical member rotating with the journalled shaft.

5. The bearing seal claimed in claim 1 in which said radially and axially coextending portions of said members are spaced sufficiently and the free ends of said axially extending portions are spaced sufficiently from adjacent radially extending portions of said members to permit substantial axial movement of said first and second members relative to said third member without interference of free relative rotation.

6. The bearing seal claimed in claim 1 in which said radially and axially coextending portions of said members are spaced sufficiently and the free ends of said axially extending portions are spaced sufficiently free adjacent radially extending portions of said members to permit substantial tilting in both directions from parallelism of said axial and radial portions of said third member with respect to said axial and radial portions of said first and second members without interference with free relative rotation.

7. The bearing seal claimed in claim 1 in which said radially and axially coextending portions of said members are spaced sufficiently and the free ends of said axially extending portions are spaced sufficiently from adjacent radially extending portions of said members to permit substantial axial movement and tilting in both directions from parallelism of said axial and radial portions of said third member with respect to said axial and radial portions of said first and second members without interference with free relative rotation.

8. The bearing seal claimed in claim 1 in which said first outer axial portion of said third member coextends with said flange at the said other end of said second member.

* * * * *